United States Patent Office
3,549,666
Patented Dec. 22, 1970

3,549,666
HALF SULFURIC ESTERS OF 1 - AMINO - 4-
(HYDROXYLOWERALKOXY) - ANILINO-
ANTHRAQUINONES
Cyril Eric Vellins, Manchester, England, assignor to Imperial Chemical Industries Limited, London, England, a corporation of Great Britain
No Drawing. Filed Nov. 25, 1966, Ser. No. 596,759
Claims priority, application Great Britain, Nov. 29, 1965, 50,539/65
Int. Cl. C09b 1/54; C07c 141/14
U.S. Cl. 260—378                           3 Claims

ABSTRACT OF THE DISCLOSURE

The half sulfuric esters of 1-amino-4-(hydroxyloweralkoxy)-anilino-anthraquinones have been prepared. They are of value for the dyeing of polyamides.

---

This invention relates to new dyestuffs, and particularly to new dyestuffs of value for the dyeing of polyamides.

It has been found that half sulphuric esters, and water-soluble salts thereof, of certain substituted diaminoanthraquinones containing hydroxyalkyl or hydroxyalkoxy groups are of special value for the dyeing of polyamides. These water-soluble dyestuffs give bright greenish blue dyeings which possess good wet and light fastness properties and also give good coverage of fibre irregularities.

According to the invention there are provided new dyestuffs which are half sulphuric esters of compounds of the formula

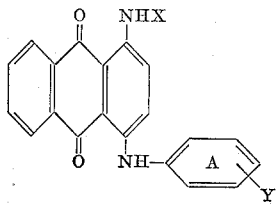

wherein X represents a hydrogen atom, a non-aromatic hydrocarbon radical or a hydroxyl substituted non-aromatic hydrocarbon radical, Y represents a hydrogen atom, an alkyl group or a hydroxyl substituted non-aromatic hydrocarbon radical attached to the nucleus A by an oxygen atom, at least one of X and Y representing a hydroxyl substituted group, and A is an aromatic nucleus which may be further substituted, or water-soluble salts of these dyestuffs.

As non-aromatic hydrocarbon groups which may be represented by X there may be mentioned methyl, ethyl, propyl, isopropyl, butyl, amyl, hexyl and isomers thereof, and cyclohexyl.

As hydroxyl substituted non-aromatic hydrocarbon groups which may be represented by X there may be mentioned for example β-hydroxyethyl, γ-hydroxypropyl, ω-hydroxybutyl and γ-chloro-β-hydroxypropyl.

As alkyl groups which may be represented by Y there may be mentioned for example methyl, ethyl, propyl and butyl.

As hydroxyl substituted non-aromatic hydrocarbon groups attached to the nucleus A by an oxygen atom and which may be represented by Y there may be mentioned for example β-hydroxyethoxy, γ-hydroxypropoxy and γ-chloro-β-hydroxypropoxy.

As optionally substituted aromatic nuclei which may be represented by A there may be mentioned phenyl, 2-, 3- or 4-methylphenyl, ethylphenyl, 4-butyl-2-methylphenyl, 2,6-dimethylphenyl, 2,4,6-trimethylphenyl, 2,6-diethyl-4-methylphenyl and 2,4,6-triethylphenyl.

The water-soluble salts may be derived from metals such as lithium, sodium and potassium or from ammonia, primary, secondary or tertiary amines or quaternary ammonium hydroxides.

The new dyestuffs of the invention may be prepared by conventional methods for example from the corresponding hydroxy compounds by treatment with concentrated sulphuric acid.

According to a further feature of the invention there is provided a process for the dyeing of polyamides which comprises treating the polyamide with an aqueous solution of a dyestuff as hereinbefore defined.

As polyamides there may be mentioned polyhexamethylene adipamide and polycaprolactam.

The polyamide may be in any suitable form, for example fibre, filament, staple, yarn, film or sheet or may be in the form of fabric or other textile articles.

The polyamide may be treated at any convenient temperature and preferably between 80 and 100° C. Temperatures above 100° C. may be used at superatmospheric pressure if desired. Acid salts such as ammonium acetate or acids such as acetic acid or other conventional auxiliary agents may be added if desired.

The preferred dyestuffs are those derived from 1-lower alkylamino-4-(β - hydroxyethoxyanilino) - anthraquinone because of their ready availability, ability to give bright greenish blue shades with good wet and light fastness and also because they give good coverage of fibre irregularities. Specific dyestuffs of these classes are 1-methylamino- and 1-isopropylamino-4-(4'-β - hydroxyethoxyanilino)anthraquinone.

The invention is illustrated but not limited by the following examples in which all parts and percentages are by weight unless otherwise stated.

EXAMPLE 1

A mixture of 5 parts of 1-β-hydroxyethylamino-4-bromoanthraquinone, 7.5 parts of 2,4-dimethylaniline, 2.5 parts of anhydrous potassium acetate, 0.2 part of copper acetate and 10 parts of ethylene glycol monoethyl ether is stirred and heated at the boiling point for 18 hours. After cooling to 20° C. 25 parts of ethyl alcohol are added and the mixture is stirred for 1 hour. The insoluble product is filtered off and washed with ethyl alcohol until the filtrate is almost colourless and then with 100 parts of water. The 1-β-hydroxyethylamino - 4 - (2':4'-dimethylanilino)-anthraquinone so obtained is dried at 70° C. and then added with stirring to 25 parts of 96% sulphuric acid at a temperature between 0 and 5° C. The solution is stirred overnight and slowly poured into 400 parts of ice and water. The product is filtered off and redissolved in water at 60° C. made alkaline to Brilliant Yellow paper by the addition of sodium carbonate. 20 parts of sodium chloride are added to the solution and the precipitated product is filtered off and dried at 70° C. The resultant dyestuff dyes polyamide such as polyhexamethylene adipamide fibres in attractive greenish blue shades possessing good wet and light fastness properties.

Example 2

A mixture of 31.6 parts of 1-methylamino-4-bromoanthraquinone, 40 parts of 4-β-hydroxyethoxyaniline, 16 parts of potassium acetate, 0.8 part of copper acetate and 80 parts of butyl alcohol is stirred and heated at the boiling point for 5 hours. After cooling to room temperature 50 parts of methyl alcohol are added and the mixture is stirred overnight. The solid is filtered off and washed with 500 parts of methyl alcohol, 250 parts of water and dried at 70° C. The 1 - methylamino-4-(4'-β-hydroxyethoxyanilino)-anthraquinone so obtained is added with stirring to 82 parts of 96% sulphuric acid at a temperature between 0 and 5° C. The solution is stirred for 4 hours at a temperature between 0 and 5° C. and for 2 hours at a temperature between 15 and 20° C. and then slowly poured into 1500 parts of ice and water. The product is filtered off and stirred in 1000 parts of water made alkaline to Brilliant Yellow paper by the addition of sodium carbonate. 20 parts of sodium chloride are added and the precipitated product is filtered off and dried at 70° C. The resultant dyestuff dyes polyhexamethylene adipamide in attractive greenish blue shades possessing good wet and light fastness properties.

EXAMPLE 3

A mixture of 50 parts of 1-amino-4-bromoanthraquinone, 25 parts of p-aminophenol, and 120 parts of phenol is stirred and heated at 100° C., and 20 parts of potassium carbonate are added slowly followed by 0.5 part of copper acetate and 0.5 part of copper bronze. The mixture is heated to 110–115° C. and stirred for 4 hours. After cooling to 25° C., 100 parts of ethyl alcohol are added and the mixture is stirred for 1 hour. The insoluble product is filtered off and washed with 250 parts of ethyl alcohol. The filter-cake is suspended in 500 parts of dilute hydrochloric acid and heated at the boiling point for ½ hour, cooled to 25° C., and filtered off. The product is washed on the filter with water and dried at 60° C. A mixture of 6.6 parts of the so-obtained 1 - amino - 4(4'-hydroxyanilino)-anthraquinone, 60 parts of methanol, 1.15 parts of potassium hydroxide and 2.8 parts of epichlorohydrin is stirred at the boil under a reflux condenser for 16 hours. A further 2.8 parts of epichlorohydrin are added and the mixture stirred at the boil under a reflux condenser for 24 hours. The mixture is then cooled to 20° C., and the precipitated 1 - amino-4-[4'-($\beta$:$\gamma$-epoxypropoxy)anilino] anthraquinone is filtered off, washed with water and dried. Hydrogen chloride is bubbled, for 1 hour, through a solution of 3 parts of 1-amino-4-[4'($\beta$:$\gamma$-epoxypropoxy) anilino]anthraquinone in 300 parts of acetone at 25° C. The acetone is then removed by steam distillation, and the precipitate filtered off, washed with water, and dried. The 1-amino-4-[4'-($\gamma$-chloro-$\beta$-hydroxypropoxy)anilino] anthraquinone so obtained is added with stirring to 25 parts of 96% sulphuric acid at a temperature between 0 and 5° C. The solution is stirred for 4 hours at a temperature between 0 and 5° C. and for 2 hours at a temperature between 15 and 20° C. and then slowly poured into 400 parts of ice and water. The product is filtered off and redissolved in water at 60° C. made alkaline to Brilliant Yellow paper by the addition of sodium carbonate. 20 parts of sodium chloride are added to the solution and the precipitated product is filtered off and dried at 70° C. The resultant dyestuff dyes polyhexamethylene adipamide in attractive blue shades possessing good wet and light fastness properties.

EXAMPLE 4

A mixture of 14 parts of 1-amino-4-(p-toluidino) anthraquinone, 70 parts of acetic acid, 13 parts of water, and 20 parts of epichlorohydrin is stirred for 18 hours at 80–85° C. 200 parts of water are then added gradually and the precipitate is filtered off, washed with water, and dried. 5 parts of the 1-($\gamma$-chloro-$\beta$-hydroxypropylamino)-4-(p-toluidino)anthraquinone so obtained are added with stirring to 25 parts of 96% sulphuric acid at a temperature between 0 and 5° C. The solution is stirred overnight and slowly poured into 400 parts of ice and water. The product is filtered off and redissolved in water at 60° C. made alkaline to Brilliant Yellow paper by the addition of sodium carbonate. 20 parts of sodium chloride are added to the solution and the precipitated product is filtered off and dried. The resultant dyestuff dyes polyamides such as polyhexamethylene adipamide in attractive greenish blue shades possessing good wet and light fastness properties.

Other dyestuffs prepared in a similar manner are listed in the following table and are identified by the substituents in the general formula:

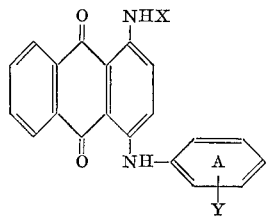

| Example No. | X | Y | Other substituents in A | Shade |
|---|---|---|---|---|
| 5 | C$_2$H$_4$OH | 2'-methyl | 4',6'-dimethyl | Blue. |
| 6 | Same | do | 4'-butyl | Greenish-blue. |
| 7 | do | 4'-methyl | | Do. |
| 8 | do | 2'-methyl | | Do. |
| 9 | (CH$_2$)$_3$OH | 4'-methyl | | Do. |
| 10 | C$_2$H$_4$OH | H | | Do. |
| 11 | Isopropyl | 4'—OC$_2$H$_4$OH | | Do. |
| 12 | Cyclohexyl | 4'—OC$_2$H$_4$OH | | Do. |
| 13 | Methyl | 3'—OC$_2$H$_4$OH | | Do. |
| 14 | H | 4'—OC$_2$H$_4$OH | | Blue. |
| 15 | H | 4'—O(CH$_2$)$_3$OH | | Do. |
| 16 | Methyl | 3'—OC$_2$H$_4$OH | 4'-methyl | Greenish-blue. |
| 17 | do | 4'—OCH$_2$CH—(OH)CH$_2$Cl | | Do. |

I claim:
1. Anthraquinone dyestuffs which are half sulfuric esters of compounds of the formula:

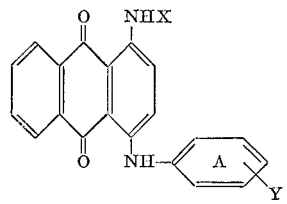

wherein the aromatic nucleus A may be substituted by one or more lower alkyl groups in addition to the substituent Y;
X represents hydrogen, lower alkyl or cyclohexyl, and
Y represents hydroxy lower alkoxy or halogen substituted hydroxy lower alkoxy.

2. An anthraquinone dyestuff as claimed in claim 1 being the half sulphuric ester of the compound of the formula:

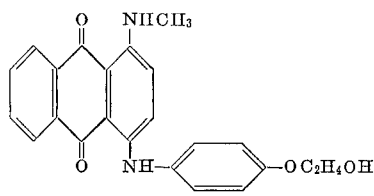

3. An anthraquinone dyestuff as claimed in claim 1 being the half sulphuric ester of the compound of the formula:
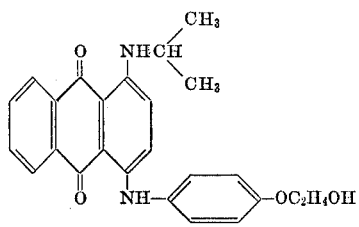
References Cited
UNITED STATES PATENTS
| | | | |
|---|---|---|---|
| 2,459,149 | 1/1949 | Coover et al. | 260—380 |
| 3,205,241 | 9/1965 | Eaton et al. | 260—374 |
FOREIGN PATENTS
| | | | |
|---|---|---|---|
| 654,616 | 12/1937 | Germany | 260—379 |
| 1,229,749 | 3/1960 | France | 260—377 |
OTHER REFERENCES
Chemisches Zentralblatt, 1938, pp. 1668–9, Abstract.
LORRAINE A. WEINBERGER, Primary Examiner
R. GERSTL, Assistant Examiner
U.S. Cl. X.R.
8—39; 260—379